(12) United States Patent
Swarts et al.

(10) Patent No.: US 8,767,700 B2
(45) Date of Patent: Jul. 1, 2014

(54) METHOD AND APPARATUS FOR DUAL FREQUENCY TIMING ACQUISITION FOR COMPRESSED WCDMA COMMUNICATION NETWORKS

(75) Inventors: Francis Swarts, San Diego, CA (US); Mark Kent, Vista, CA (US); Uri Landau, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/489,169

(22) Filed: Jun. 5, 2012

(65) Prior Publication Data

US 2012/0243512 A1 Sep. 27, 2012

Related U.S. Application Data

(63) Continuation of application No. 11/364,751, filed on Feb. 28, 2006, now Pat. No. 8,218,517.

(51) Int. Cl.
*H04B 7/216* (2006.01)

(52) U.S. Cl.
USPC ............ 370/342; 370/335; 370/500; 370/503

(58) Field of Classification Search
USPC ....................................................... 370/342
See application file for complete search history.

(56) References Cited

U.S. PATENT DOCUMENTS

| | | | |
|---|---|---|---|
| 6,359,874 B1 * | 3/2002 | Dent ............................. | 370/342 |
| 6,597,679 B1 | 7/2003 | Willars | |
| 6,724,738 B1 * | 4/2004 | Storm et al. .................. | 370/320 |
| 6,845,238 B1 | 1/2005 | Muller | |
| 2001/0019576 A1 * | 9/2001 | Nystrom et al. .............. | 375/136 |
| 2001/0024451 A1 * | 9/2001 | Le Strat et al. ............... | 370/468 |
| 2002/0093922 A1 | 7/2002 | Grilli et al. | |
| 2003/0118136 A1 * | 6/2003 | Tiedemann et al. .......... | 375/354 |
| 2003/0134597 A1 * | 7/2003 | Rao et al. ........................ | 455/63 |
| 2003/0207696 A1 | 11/2003 | Willenegger et al. | |
| 2005/0008040 A1 * | 1/2005 | Becker et al. ................. | 370/503 |
| 2005/0054368 A1 * | 3/2005 | Amerga ........................ | 455/525 |
| 2005/0094816 A1 | 5/2005 | Lindoff et al. | |
| 2005/0277416 A1 | 12/2005 | Tolli et al. | |
| 2006/0039330 A1 * | 2/2006 | Hackett et al. ................ | 370/335 |
| 2007/0037594 A1 * | 2/2007 | Palenius et al. .............. | 455/502 |
| 2007/0049324 A1 | 3/2007 | Sambhwani et al. | |

* cited by examiner

*Primary Examiner* — Kiet Doan
*Assistant Examiner* — Mazda Sabouri
(74) *Attorney, Agent, or Firm* — Sterne, Kessler, Goldstein & Fox P.L.L.C.

(57) ABSTRACT

Methods and systems for dual frequency timing acquisition for compressed WCDMA communication networks may include processing received WCDMA signals. The WCDMA signals, which may be primary synchronization channel signals, may comprise signals transmitted by one base station at one frequency band and by another base station at a different frequency band, during a compressed frame. Samples of the received WCDMA signals from the different base stations may be stored in portions of a memory allocated for signals from each base station. The received WCDMA signals having the first frequency band may be processed via the processing circuitry during a non-compressed frame. The samples corresponding to the signals with the first frequency band during the non-compressed frame may be stored in the memory. The received WCDMA signals may be sampled at a faster rate during the non-compressed frame than during the compressed frame.

19 Claims, 7 Drawing Sheets

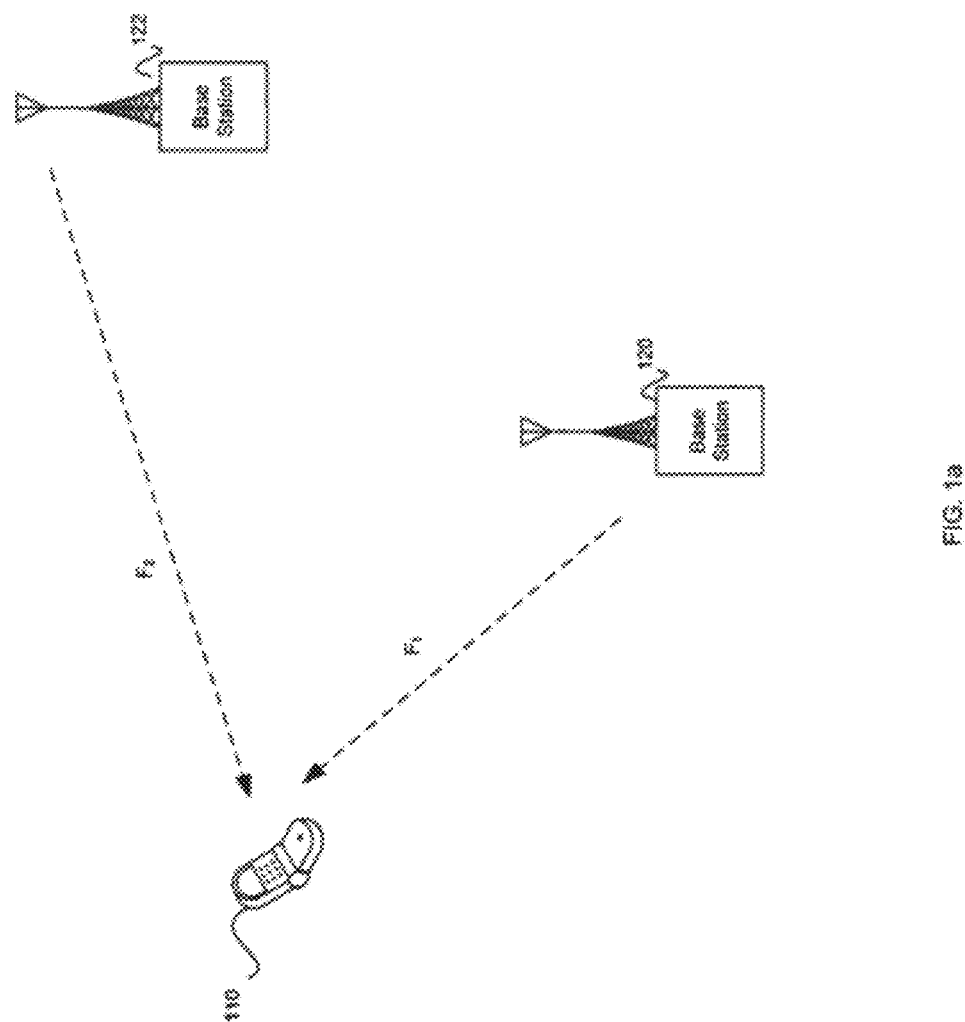

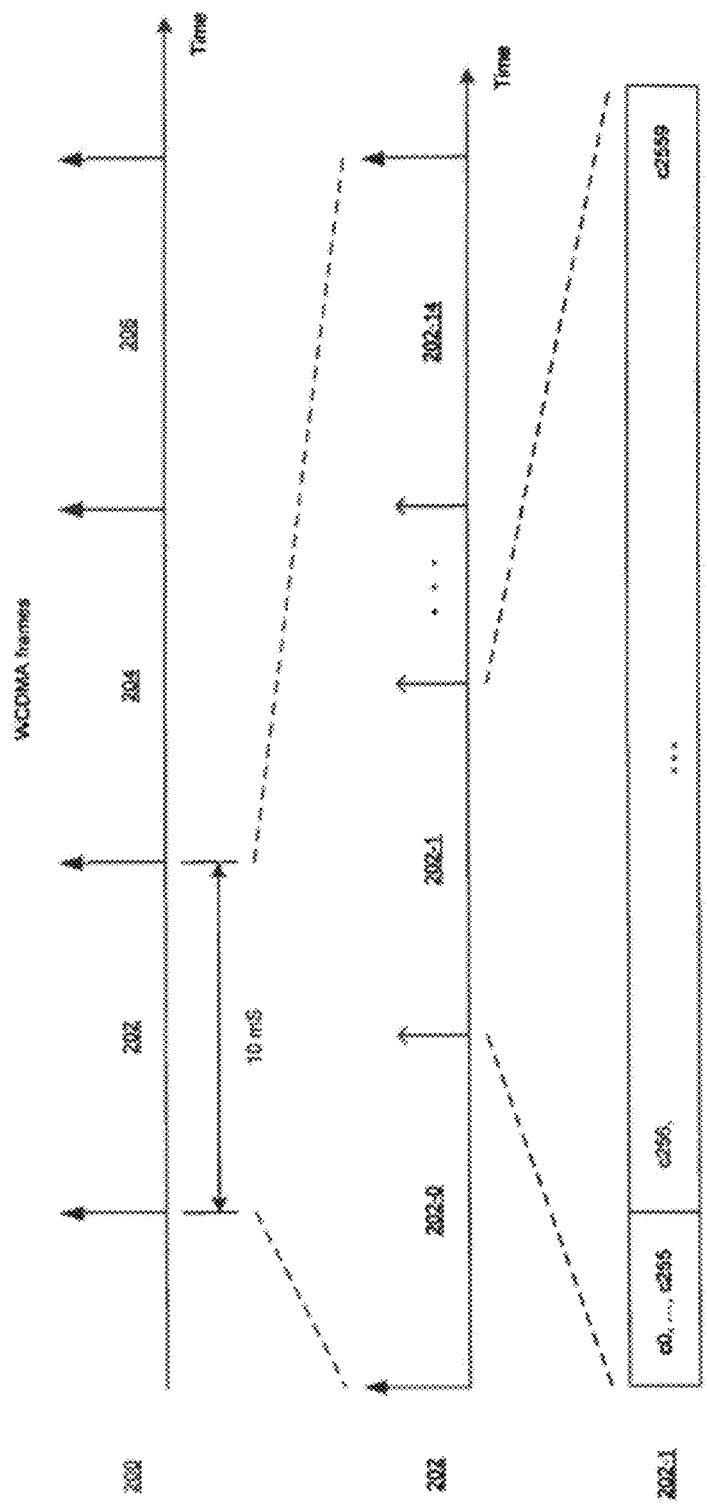

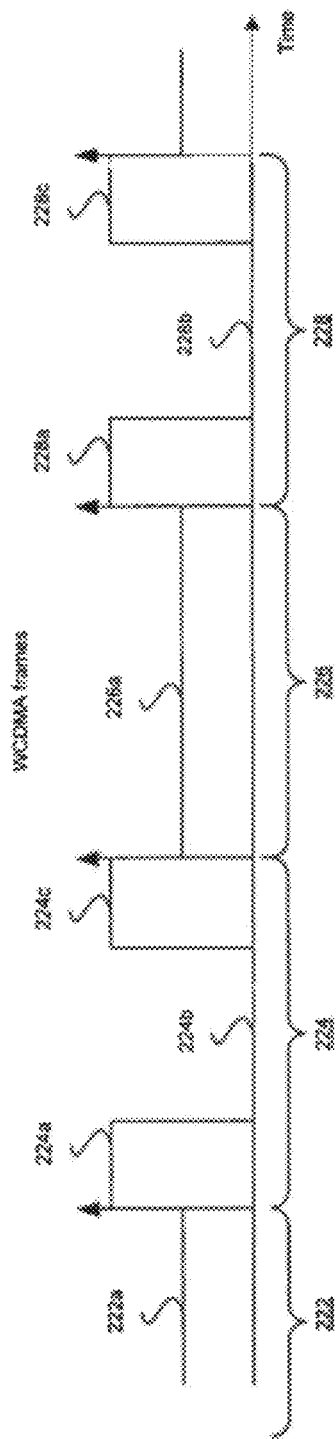

METHOD AND APPARATUS FOR DUAL FREQUENCY TIMING ACQUISITION FOR COMPRESSED WCDMA COMMUNICATION NETWORKS

CROSS-REFERENCE TO RELATED APPLICATION(S)

The present application is a continuation of U.S. patent application Ser. No. 11/364,751, filed Feb. 28, 2006, now allowed, which is incorporated herein, by reference in its entirety.

BACKGROUND OF THE INVENTION

1. Field of the Invention

Certain embodiments of the invention relate to wireless communication. More specifically, certain embodiments of the invention relate to a method and system for dual frequency timing acquisition for compressed WCDMA communication networks.

2. Background Art

Mobile communication has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DST service providers. In this regard, networks based on wideband CDMA (WCDMA) technology may make the delivery of data to end users a more feasible option for today's wireless carriers.

WCDMA networks may allow a mobile handset to communicate with a multiple number of base stations. This may take place, for example, during a soft-handoff from one base station to another base station that utilizes the same frequency band. On occasions, there may be handoffs from one base station to another where the two base stations use different frequencies. This may occur, for example, when a mobile station interfaces with a different wireless service provider, or for hotspots where one service provider may need to use more than one frequency. In these cases, the mobile handset may need to tune in to the frequency of the new base station. This may require additional circuitry to be able to synchronize to a second frequency of the second base station while still using the first frequency for communicating with the first base station. The additional synchronization circuitry may be an undesirable extra cost for the mobile handset.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for dual frequency timing acquisition for compressed WCDMA communication networks, substantially as shown in and/or described in connection with at least one of the figures, as set forth more completely in the claims.

Various advantages, aspects and novel features of the present invention, as well as details of an illustrated embodiment thereof will be more fully understood from the following description and drawings.

BRIEF DESCRIPTION OF SEVERAL VIEWS OF THE DRAWINGS

FIG. 1a is an exemplary diagram illustrating a WCDMA handset communicating with two WCDMA base stations, which may be utilized in connection with an embodiment of the invention.

FIG. 2a illustrates exemplary WCDMA frames, which may be utilized in connection with an embodiment of the invention.

FIG. 2b illustrates exemplary compressed WCDMA frames, which may be utilized in connection with an embodiment of the invention.

DETAILED DESCRIPTION OF THE INVENTION

Figure 1B:
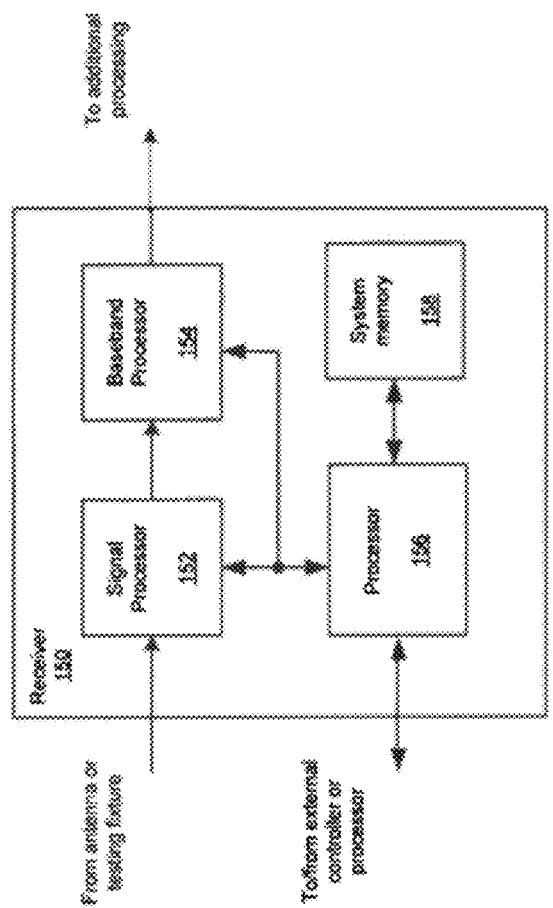
FIG. 1b is a block diagram of an exemplary RF receiver system, which may be utilized in connection with an embodiment of the invention.

Certain embodiments of the invention may be found in a method and system for dual frequency timing acquisition for compressed WCDMA communication networks. Aspects of the method may comprise processing received WCDMA signals. The WCDMA signals, which may be primary synchronization channel signals, may comprise signals transmitted by one base station at one frequency band and by another base station at a different frequency band, during a compressed frame. The compressed frame may be a frame with respect to one of the base stations.

Samples of the received WCDMA signals having a first frequency band and the received WCDMA signals having a second frequency band may be stored in different portions of the memory. For example, a different portion of the memory may be allocated for signals from each base station. The stored samples may be fed back for further processing during subsequent time slots. The stored samples corresponding to a first base station may be fed back when that base station is transmitting during a compressed frame. The stored samples corresponding to a second base station may be fed back when that base station is transmitting during a portion of the compressed frame when the first base station is not transmitting.

The received WCDMA signals having the first frequency band may be processed via the processing circuitry and the memory coupled to the processing circuitry during a non-compressed frame. The samples corresponding to the received WCDMA signals having the first frequency band during the non-compressed frame may be stored in a portion of the memory. The stored samples may be fed back for further processing during subsequent slot times.

The received WCDMA signals may be sampled at a faster rate during the non-compressed frame than during the compressed frame. For example, a sampling rate utilized during a non-compressed frame may be twice a sampling rate utilized during a compressed frame. The processing circuitry may also determine compressed WCDMA frames based on information received from one of the plurality of base stations.

FIG. 1a is an exemplary diagram illustrating a WCDMA handset communicating with two WCDMA base stations, which may be utilized in connection with an embodiment of the invention. Referring to FIG. 1a, there is shown a mobile terminal 110 and base stations 120 and 122. The mobile terminal 110 may receive communications from the base station 120 using frequency $F_1$. As the mobile terminal moves away from the base station 120, the next nearest base station that may handle the connection to the mobile terminal 110 may be the base station 122. However, the base station 122 may use frequency $F_2$ rather than frequency Fi. Accordingly, the mobile terminal 110 may need to tune in to a new frequency in order to be able to be handed off to the base station 122. This type of hand-off may be referred to as an inter-frequency hand-off. The base stations 120 and 122 may be part of one wireless network that may use different frequencies in order to be able to handle a large traffic load within a limited geographical area. Alternatively, the base stations 120 and 122 may be parts of different wireless networks. Inter-frequency handoffs may also occur when a WCDMA network needs to handoff a mobile device to a second generation (2G) network.

To handle cases like this, a WCDMA network may operate in a compressed mode where the mobile terminal 110 may search for new frequencies used by other base stations. The frames during which the searches occur may be referred to as compressed frames since the base station may only transmit during a portion of the frames. The period of time in a compressed frame when there is no transmission may be used by the mobile terminal to search for base stations on other frequencies.

The decision to use a compressed transmit mode may be a network decision, although the invention may not be so limited. Accordingly, a base station may indicate to a mobile terminal to look for other WCDMA frequencies. For example, the base station may indicate that a compressed frame may be a Mth frame and every Nth frame after that. Alternatively, the base station may indicate to the mobile terminal that a specific frame may be a compressed frame.

FIG. 1b is a block diagram of an exemplary RF receiver system, which may be utilized in connection with an embodiment of the invention. Referring to FIG. 1b, there may be shown a RF receiver system 150 that may comprise a signal processor block 152, a baseband processor block 154, a processor 156, and a system memory 158. The signal processor block 152 may comprise suitable logic, circuitry, and/or code that may be adapted for receiving RF signals. The signal processor block 152 may be coupled to an external antenna for signal reception. The signal processor block 152 may demodulate a received signal before further processing. Moreover, the signal processor block 152 may comprise other functions, for example, filtering the received signal, amplifying the received signal, and/or downconverting the received signal to an analog baseband signal. The signal processor block 152 may also digitize the analog baseband signal to a digital baseband signal, and digitally process the digital baseband signal, for example, to filter the digital baseband signal.

The baseband processor block 154 may comprise suitable logic, circuitry, and/or code that may be adapted for processing the digital baseband signals communicated by the signal processor block 152. The processor 156 may comprise suitable logic, circuitry, and/or code that may be adapted for controlling the operations of the signal processor block 152 and/or the baseband processor block 154. For example, the processor 156 may be utilized to update and/or modify programmable parameters and/or values in a plurality of components, devices, and/or processing elements that may be in the signal processor block 152 and/or the baseband processor block 154. For example, there may be programmable gain amplifiers in the signal processor block 152. Control and/or data information may be transferred from at least one processor external to the RF receiver system 150 to the processor 156. Similarly, the processor 156 may transfer control and/or data information to at least one processor external to the RF receiver system 150.

The processor 156 may utilize the received control and/or data information to determine the mode of operation of the signal processor block 152. For example, the processor 156 may select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the system memory 158 via the processor 156. This information stored in system memory 158 may be transferred to the signal processor block 152 from the system memory 158 via the processor 156. The system memory 158 may comprise suitable logic, circuitry, and/or code that may be adapted for storing a plurality of control and/or data information, including parameters needed to calculate frequencies and/or gain, and/or the frequency value and/or gain value.

FIG. 2a illustrates exemplary WCDMA frames, which may be utilized in connection with an embodiment of the invention. Referring to FIG. 2a, there is shown a graph of WCDMA frames 200, a graph of a frame 202 showing slots within a frame, and a graph of a slot 202-1 that comprises chips within a slot. The graph of WCDMA frames 200 shows frames 202, 204, and 206, where each frame may be 10 milliseconds (ms) in duration. A base station may transmit data and control information in parallel during each frame. Each frame may comprise 38,400 chips for an effective chip rate of 3.84 mega-chips per second (Mcps). A base station may be uniquely identified by its downlink scrambling code that may be 38,400 chips in length. The spreading factor for each frame may range from 512 to 4 for the downlink transmission from the base station. Accordingly, the modulation symbol rate may vary from 15 K symbols/second to 960 K symbols/second, respectively.

Each frame, for example, the frame 202, may comprise 15 slots, for example, the slots 202-0, 202-1, . . . , 202-14. Since a frame may comprise 38,400 chips, each slot may comprise 2,560 chips. Each slot may comprise 10 symbols, with each symbol comprising 256 chips. There is shown the slot 202-1, which may comprise chips c0 to c2559. The first 256 chips, for example, c0 to c255, may be dedicated to primary synchronization signals. The base stations may use the same code for primary synchronization signals. Accordingly, only one matched filter may be needed to synchronize to time slots transmitted by any base station.

In order to prevent signals transmitted by other base stations from interfering with the primary synchronization signals transmitted by the desired base station, the code sequence for the primary synchronization signals may have good auto-correlation properties. That is, when the code sequence of the primary synchronization signals is correlated with itself, the interference from adjacent base stations may be minimized. The mobile terminal may use a synchronization matched filter to determine appropriate slot timing of a base station. The mobile terminal may need to determine slot timing to be able to synchronize with the base station in order to receive and decode data transmitted by the base station.

A mobile terminal may further synchronize to the frames transmitted by the base station by next determining a code sequence of the secondary synchronization signals transmitted by the base station. The code sequence may comprise a sequence for each of the 15 slots in a frame, and the code sequence may repeat for each frame. Accordingly, after slot timing is determined, frame boundaries may also be determined.

A mobile terminal may therefore identify a base station by finding the correct scrambling code for the base station, determine slot boundaries of that base station by synchronizing to primary synchronization signals from the base station, and then determine frame boundaries of that base station by synchronizing to secondary synchronization signals from that base station.

FIG. 2b illustrates exemplary compressed WCDMA frames, in connection with utilization of an embodiment of the invention. Referring to FIG. 2b, there is shown WCDMA frames 222, 224, 226, and 228. A base station, for example, the base station 120 or 122, may transmit at a constant power for a period of the frame for normal frames, for example, the frames 222 and 226. However, during compressed frames, a base station may only transmit during part of a frame. For example, the WCDMA frames 224 and/or 228 may be compressed frames that have transmission gaps 224b and 228b, respectively, during which a base station may not transmit. However, the base station may transmit during certain transmission periods of the compressed WCDMA frames 224 and 228. For example, the base station 120 or 122 may transmit during the transmission periods 224a and 224c for the WCDMA frame 224, and during the transmission periods 228a and 228c for the compressed WCDMA frame 228. The mobile terminal 110 may utilize this transmission gap from one base station, for example, the base station 120, to search for another base station, for example, the base station 122, which may be transmitting at a different frequency.

A base station, for example, the base station 120, may increase instantaneous transmit power during transmission periods in the compressed frames, for example, the transmission periods 224a, 224c, 228a, and/or 228c, in order to keep data quality from being affected by reduced processing gain. The amount of power increase may depend on the transmission time reduction method. Accordingly, the transmission periods 224a, 224c, 228a, and/or 228c may be at a higher power level than the transmission periods of a normal, non-compressed frame, such as, for example, the frames 222 and/or 226.

A first method of transmission time reduction may decrease the spreading factor by, for example, a ratio of 2:1. This may result in an increased data rate where bits may be transmitted twice as fast as during normal frames. A second method of transmission time reduction may comprise puncturing bits. Puncturing bits may remove various bits from the original data to reduce the amount of information that needs to be transmitted. A third method a transmission time reduction may be where a higher layer scheduling is changed to use fewer time slots for user traffic. A WCDMA wireless system using compressed frame transmission mode may determine that a frame be a compressed frame at a periodic rate. Alternatively, a WCDMA wireless system may specify certain frames as compressed frames. This may depend on various parameters such as, for example, traffic load for the various base stations and/or transmission power requirements for the base stations and/or the mobile terminals.

Figure 3A:
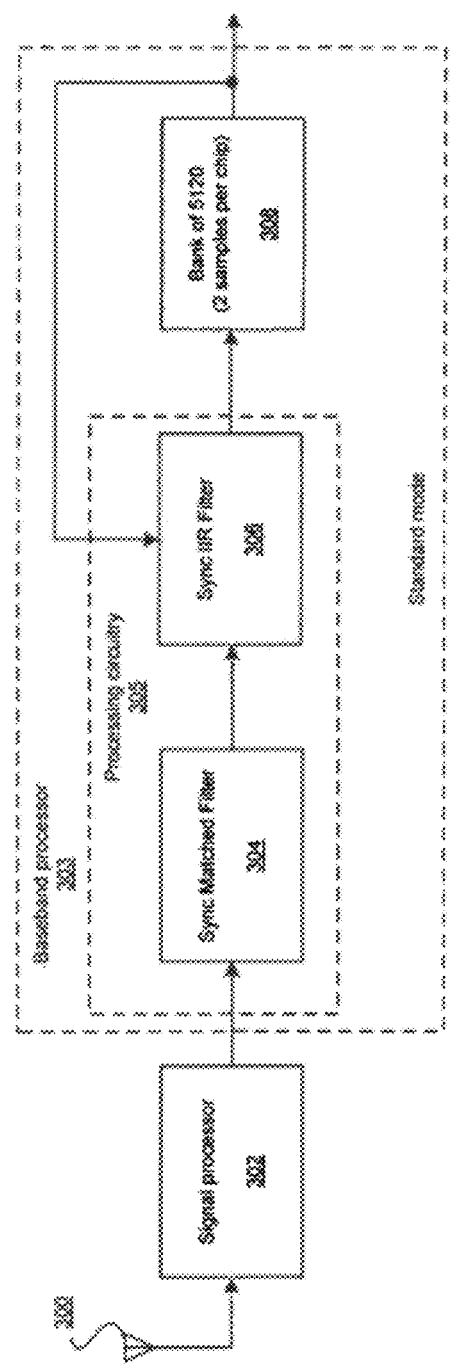
FIG. 3a is an exemplary block diagram for tuning to a single frequency, in accordance with an embodiment of the invention.

FIG. 3a is an exemplary block diagram for a mobile terminal circuitry that tunes to a single frequency, in accordance with an embodiment of the invention. Referring to FIG. 3a, there is shown an antenna 300, a signal processor block 302, and a baseband processor block 303. The baseband processor block 303 may comprise, among other functionalities, a processing circuitry block 305 and a memory block 308. The processing circuitry block 305 may comprise a synchronizing matched filter block 304 and a synchronizing infinite impulse response (IIR) filter block 306.

The signal processor block 302 may comprise suitable circuitry, logic, and/or code that may be adapted for processing radio frequency (RF) signals received by the antenna 300. Processing of the RF signals may comprise converting the RF signal to a digital baseband signal. The digital baseband signal may also be, for example, despread using a Gold code or other orthogonal variable spreading factor (OVSF) codes, that may be applied to received signals through a method that may comprise multiplication and accumulation operations. Processing gain may be realized after completion of integration over a pre-determined number of chips in which the symbol is modulated.

Following despreading at the signal processor block 302, the original symbol may be extracted. WCDMA may support the simultaneous transmission of a plurality of spread spectrum signals in a single RF signal by utilizing spreading codes among the spread spectrum signals which are orthogonal to reduce multiple access interference (MAI). The receiving device may extract an individual symbol from the transmitted plurality of spread spectrum signals by applying a despreading code, which may be equivalent to the code that was utilized for generating the spread spectrum signal.

The synchronizing matched filter block 304 may comprise suitable circuitry, logic, and/or code that may be adapted for finding slot synchronization to a base station by processing the primary synchronization signals. The synchronizing matched filter block 304 may, for example, comprise utilization of pruned efficient Golay correlation. The synchronizing matched filter block 304 may accumulate and integrate the symbols received from the base station. The output of the synchronizing matched filter block 304 may be continuous in time or at discrete intervals, and may produce a peak or correlation when the input signal matches the locally generated known sequence. This may occur, for example, when the 256 primary synchronization signal chips at the beginning of a slot are matched using an appropriate primary synchronization code. A number of chips other than 256 chips may also be used for correlation. The output may be communicated to the synchronizing IIR filter block 306.

The synchronizing IIR filter block 306 may comprise suitable circuitry, logic, and/or code that may be adapted for operating on each of the correlation magnitudes over an entire slot. The entire slot may be sampled and the samples accumulated into a buffer, for example, the memory block 308. The memory block 308 may be, for example, 5120 samples deep. Since a slot comprises 2560 chips, this may be equivalent to two samples per chip. A number of the samples with greatest magnitudes, or correlation peaks, may then be selected and further processed in, for example, the baseband processor block 303, to determine slot synchronization.

In order to further enhance the quality of peaks chosen, the peak values of the samples may be compared to a noise floor of the IIR filter block 306. Any peak that exceeds the noise floor by a certain margin may be chosen to be processed to determine slot synchronization. Selection of the margin may be dependent on parameters such as, for example, amount of wireless user traffic and power levels used by the base stations and/or the mobile terminals. Additionally, the samples stored in the memory block 308 may also be fed back to the synchronizing IIR filter block 306 for further processing. In this manner, the samples from a plurality of slots may be processed and/or accumulated together to provide better peak values.

In operation, the signal processor block 302 may process the signals received by the mobile terminal antenna 300. The signal processor block 302 may communicate a digital baseband output to the synchronizing matched filter block 304, which may correlate the symbols received from the base station. The correlation output may be communicated to the IIR filter block 306 which may sample the correlation output. The sampled data may be stored in a buffer, for example, the memory block 308. The IIR filter block 306 may select the most likely samples that may indicate a slot boundary based on design parameters. The design parameters may be, for example, the amount of wireless traffic and/or power levels used for data transmission. The selected samples may be further processed by, for example, the baseband processor block 303 to determine slot timing.

Figure 3B:
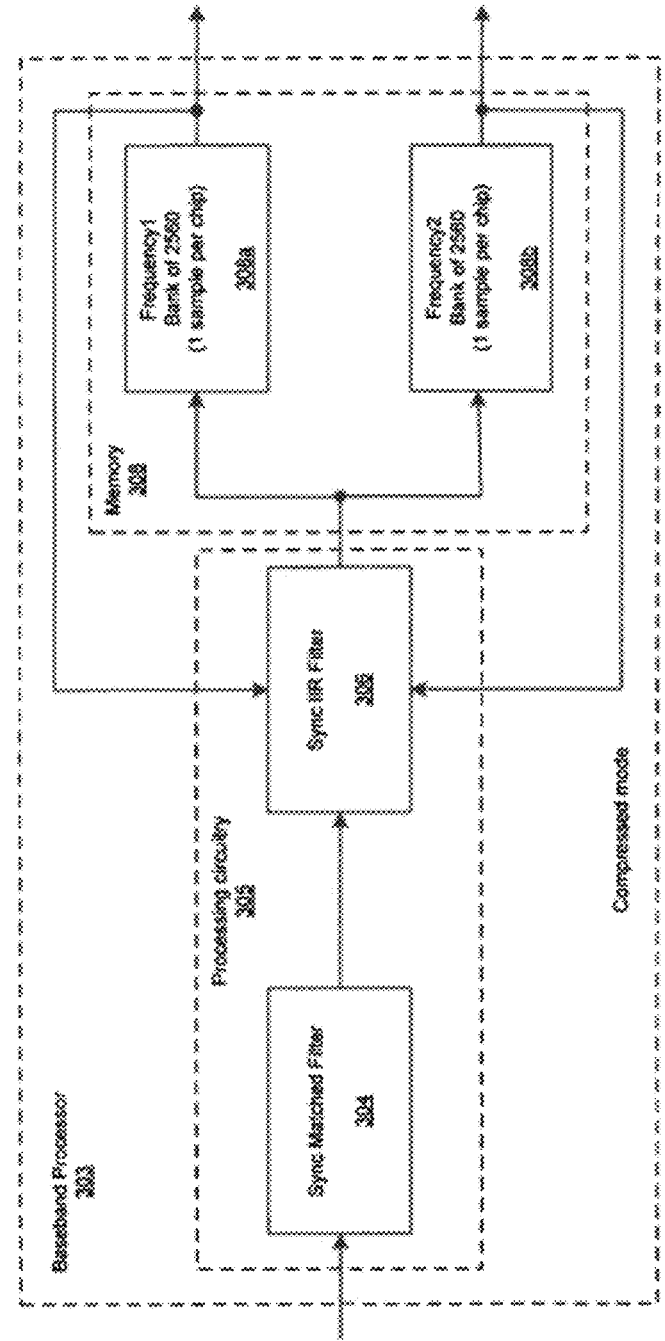
FIG. 3b is an exemplary block diagram for tuning to a second frequency while using a first frequency, in accordance with an embodiment of the invention.

FIG. 3b is an exemplary block diagram for a mobile terminal circuitry that tunes to a second frequency while using a first frequency, in accordance with an embodiment of the invention. Referring to FIG. 3b, there is shown a baseband processor block 303 that may comprise a processing circuitry block 305 and memory block 308. The processing circuitry block 305 may comprise synchronizing matched filter block 304 and a synchronizing infinite impulse response (IIR) filter block 306. The memory block 308 may comprise memory blocks 308a and 308b.

Each of the blocks may have similar functionalities as described with respect to FIG. 3a when receiving a signal from a single base station in a normal, non-compressed mode. The two memory blocks 308a and 308b may be used, for example, as a single memory block 308 that may be able to store two samples for each chip. However, when operating in a compressed mode, the two memory blocks 308a and 308b may be used separately, for example, where each memory block may be dedicated to received signals from one of two different base stations. For example, the memory block 308a may be used to store one sample per chip for signals transmitted by the base station 120, and the memory block 308b may be used to store one sample per chip for signals transmitted by the base station 122.

The samples in the memory blocks 308a and 308b may be fed back to the synchronizing IIR filter block 306 to process and accumulate the samples together over a plurality of slots. Accumulation of processed samples over a plurality of slots may provide a better result for determining slot synchronization than using the result of one slot.

Although the memory blocks 308a and 308b are shown as separate memory blocks, the actual memory used may be either physically separate or logically separate. For example, if the memory blocks 308a and 308b are logically separate, they may occupy separate regions of memory. Accordingly, in one embodiment of the invention, a lower addressable region may be dedicated to one memory block and a higher addressable region may be dedicated to the other memory block. In another embodiment of the invention, odd addresses may be used to access one memory block and even addresses may be used to access the other memory block.

Figure 4:
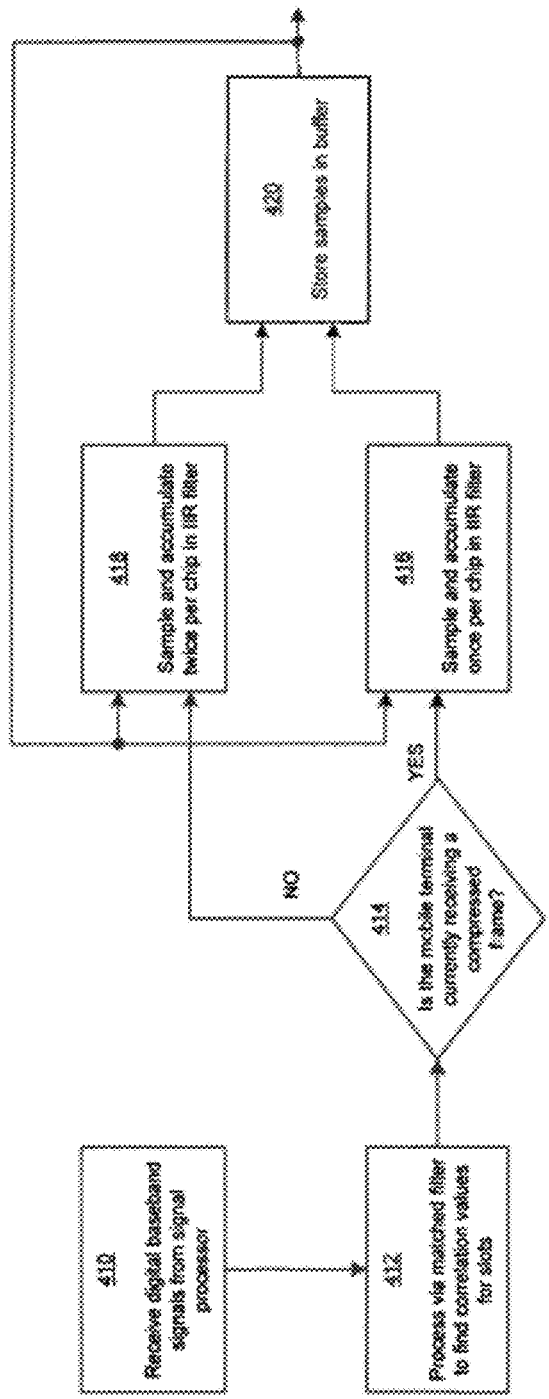
FIG. 4 is a flow chart illustrating exemplary steps for detecting a frequency band used by another base station that may be different than a frequency band used by a first base station, in accordance with an embodiment of the invention.

FIG. 4 is a flow chart illustrating exemplary steps for detecting a frequency band used by another base station that may be different than a frequency band used by a first base station, in accordance with an embodiment of the invention. Referring to FIG. 4, the steps 410 to 420 may be utilized to detect a base station using a different frequency. In step 410, digital baseband signal may be communicated from, for example, the signal processor block 302 to the baseband processor block 303.

In step 412, the synchronizing matched filter block 304, which may be a part of the baseband processor block 303, may process the digital baseband signal. The synchronizing matched filter block 304 may accumulate and integrate the symbols received from the base station. The output of the synchronizing matched filter block 308 may be continuous in time or at discrete intervals, and may produce correlation outputs as the input signal is compared with a locally generated known sequence. A maximum correlation output may occur, for example, when a determined number of primary synchronization signal chips at the beginning of a slot are matched using an appropriate primary synchronization code. For example, the number of chips used may be 256. The peaks may be communicated to the synchronizing IIR filter block 306.

In step 414, whether the mobile terminal is in a compressed frame may be determined. For example, the base station 120 may have communicated to the mobile terminal 110 whether to enter a compressed mode to locate a base station that may be transmitting at a different frequency. In a compressed mode, the mobile terminal 110 may be communicating with the base station 120, while searching for a second base station that may be transmitting at a different frequency than the first base station. The search may occur during periods of compressed frames when the base station 120 is not transmitting. If the mobile terminal 110 is in a compressed frame, the next step may be step 416. Otherwise, the next step may be step 418.

In step 416, the synchronizing IIR filter block 306 may sample the output of the synchronizing matched filter block 304 once per chip. Some slots of a compressed frame may be from one base station and some slots of the compressed frame may be from another base station. Accordingly, the samples may need to be coordinated when stored in memory to keep samples from the different base stations separate. The next step may be step 420.

In step 418, the mobile terminal 110 may not be in a compressed mode. That is, the mobile terminal 110 may not be trying to locate a base station that is transmitting at a different frequency. Accordingly, the synchronizing IIR filter block 306 may sample the output of the synchronizing matched filter block 304 twice per chip. In this manner, there may be better granularity with respect to detecting peaks for correlation to slot timing. The sampled signal may correspond to a single base station, for example, the base station 120.

In step 420, for a compressed frame, the memory block 308 may be separated to two memory blocks 308a and 308b. Accordingly, samples from the first base station, for example, the base station 120, may be stored in, for example, the memory block 308a, while samples from the second base station, for example, the base station 122, may be stored in the memory block 308b. In a non-compressed frame, the samples from the synchronizing IIR filter block 306 may be stored in the memory block 308. The memory block 308 may be allocated for storing the samples corresponding to the single base station.

The samples stored in the memory block 308 may be fed back to the synchronizing IIR filter block 306 at successive slot times. This may allow accumulation of data over a plurality of slots in order to better determine peak values for determining slot timing and for keeping slot synchronization. Accordingly, during a compressed frame, the stored values in the memory block 308a may be fed back when data is received from the base station 120, while the stored values from the memory block 308b may be fed back when data is received from the base station 122. During a non-compressed frame, the stored values of the memory block 308 may be fed back for successive slots in that frame.

In accordance with an embodiment of the invention, aspects of an exemplary system may comprise processing circuitry and memory coupled to the processing circuitry that enables processing of received WCDMA signals. The WCDMA signals, which may be primary synchronization channel signals, may comprise signals transmitted by the base station 120 at one frequency band and by another base station 122 at a different frequency band, during a compressed frame. The compressed frame may be with respect to one of the base stations, for example, the base station 120.

The processing circuitry may be, for example, the processing circuitry block 305 that may comprise the synchronizing matched filter block 304 and the synchronizing IIR filter block 306. The memory may be the memory block 308, which may comprise the memory blocks 308a and 308b. The synchronizing IIR filter block 306 may sample the received WCDMA signals, and the samples of the first frequency band and the second frequency band may be stored in different portions of the memory block 308, for example, memory blocks 308a and 308b, respectively.

The stored samples may also be fed back to the synchronizing IIR filter block 306 for further processing during subsequent slot times. The stored samples corresponding to the base station 120, which may be transmitting WCDMA signals at one frequency band, may be fed back when the base station 120 may be transmitting during a compressed frame. The stored samples corresponding to the base station 122, which may be transmitting WCDMA signals at a different frequency band, may be fed back when the base station 122 may be transmitting during the portion of the compressed frame when the base station 120 is not transmitting.

The processing circuitry 305 and the memory block 308 may enable processing of the received WCDMA signals having the first frequency band transmitted by the base station 120 during a non-compressed frame. The processing circuitry block 305 may enable storing of samples corresponding to the received WCDMA signals having the first frequency band during the non-compressed frame in at least a portion of the memory block 308. The stored samples may be fed back to the synchronizing IIR filter block 306 for further processing during subsequent slot times.

The processing circuitry block 305 may enable sampling at a faster rate during the non-compressed frame than during the compressed frame. For example, the non-compressed frame sampling rate may be twice the compressed frame sampling rate. The processing circuitry block 305 may enable determination of compressed WCDMA frames based on information received from one of the plurality of base stations.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments failing within the scope of the appended claims.

What is claimed is:

1. A method for processing signals in a wireless communication device having processing circuitry and a memory, comprising:
    sampling, during a compressed frame, first received signals having a first frequency band and second received signals having a second frequency band to generate first and second samples;
    storing the first and second samples in the memory;
    feeding back only the first samples from the memory to the processing circuitry when third signals having the first frequency band are being received and sampled by the wireless communication device during the compressed frame to generate third samples;
    processing, by the processing circuitry, the first samples together with the third samples; and
    sampling, during a non-compressed frame, fourth received signals having the second frequency band to generate fourth samples, wherein the sampling of the fourth received signals during the non-compressed frame is performed at a higher rate than the sampling of the first received signals and the second received signals during the compressed frame.

2. The method of claim 1, wherein storing the first and second samples in the memory comprises storing the first and second samples in different portions of the memory.

3. The method of claim 1, further comprising:
    feeding back the second samples from the memory to the processing circuitry when fifth signals having the second frequency band are being received by the wireless communication device during the compressed frame.

4. The method of claim 1, wherein the sampling of the fourth received signals during the non-compressed frame is performed at twice a sampling rate used in the sampling of the first received signals and second received signals during the compressed frame.

5. The method of claim 4, further comprising:
storing the fourth samples in the memory; and
feeding back the fourth samples from the memory to the processing circuitry during subsequent time slots.

6. The method of claim 1, wherein the first received signals correspond to a first base station, and wherein feeding back the first samples from the memory to the processing circuitry comprises feeding back the first samples from the memory to the processing circuitry when the first base station is transmitting during the compressed frame.

7. The method of claim 1, wherein the first and second received signals include WCDMA signals.

8. The method of claim 7, wherein the WCDMA signals include a primary synchronization channel signal.

9. The method of claim 1, further comprising:
determining the compressed frame based on information received from a base station.

10. The method of claim 9, wherein the compressed frame includes transmission gaps during which the base station does not transmit.

11. A wireless communication device, comprising:
processing circuitry configured to sample, during a compressed frame, first received signals having a first frequency band and second received signals having a second frequency band to generate first and second samples; and
a memory configured to store the first and second samples and to feed back only the first samples to the processing circuitry when third signals having the, first frequency band are being received by the wireless communication device during the compressed frame,
wherein the processing circuitry is further configured to sample the third signals to generate third samples and to process the first samples together with the third samples,
wherein the processing circuitry is further configured to sample, during a non-compressed frame, fourth received signals having the second frequency band to generate fourth samples, and wherein the processing circuitry is configured to sample the fourth received signals during the non-compressed frame at a higher rate than the first received signals and second received signals during the compressed frame.

12. The wireless communication device of claim 11, wherein the memory comprises a first portion configured to store the first samples and a second portion configured to store the second samples.

13. The wireless communication device of claim 11, wherein the first received signals correspond to a first base station, and wherein the memory is configured to feed back the first samples to the processing circuitry when the first base station is transmitting during the compressed frame.

14. The wireless communication device of claim 11, wherein the first and second received signals include WCDMA signals.

15. The wireless communication device of claim 14, wherein the WCDMA signals include a primary synchronization channel signal.

16. The wireless communication device of claim 11, wherein the processing circuitry is further configured to determine the compressed frame based on information received from a base station.

17. The wireless communication device of claim 16, wherein the compressed frame includes transmission gaps during which the base station does not transmit.

18. The method of claim 1, wherein processing the first samples together with the third samples comprises accumulating the first samples together with the third samples.

19. The wireless communication device of claim 11, wherein the processing circuitry is further configured to accumulate the first samples together with the third samples.

* * * * *

UNITED STATES PATENT AND TRADEMARK OFFICE
CERTIFICATE OF CORRECTION

| | |
|---|---|
| PATENT NO. | : 8,767,700 B2 |
| APPLICATION NO. | : 13/489169 |
| DATED | : July 1, 2014 |
| INVENTOR(S) | : Swarts et al. |

Page 1 of 1

It is certified that error appears in the above-identified patent and that said Letters Patent is hereby corrected as shown below:

In the Claims

Claim 11, Column 11, line 29, replace "having the, first frequency" with --having the first frequency--.

Signed and Sealed this
Seventh Day of October, 2014

Michelle K. Lee
*Deputy Director of the United States Patent and Trademark Office*